(12) United States Patent
Fujiwara et al.

(10) Patent No.: US 8,662,526 B2
(45) Date of Patent: Mar. 4, 2014

(54) AIRBAG DEVICE FOR PASSENGER'S SEAT

(75) Inventors: Yusuke Fujiwara, Okazaki (JP); Osamu Fukawatase, Miyoshi (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/877,462

(22) PCT Filed: Oct. 4, 2011

(86) PCT No.: PCT/IB2011/002318
§ 371 (c)(1),
(2), (4) Date: Apr. 3, 2013

(87) PCT Pub. No.: WO2012/046119
PCT Pub. Date: Apr. 12, 2012

(65) Prior Publication Data
US 2013/0187365 A1    Jul. 25, 2013

(30) Foreign Application Priority Data
Oct. 5, 2010 (JP) ................................. 2010-225921

(51) Int. Cl.
*B60R 21/215* (2011.01)
*B60R 21/2165* (2011.01)

(52) U.S. Cl.
CPC ........... *B60R 21/215* (2013.01); *B60R 21/2165* (2013.01); *B60R 2021/21543* (2013.01)
USPC ....................................... 280/728.3; 280/732

(58) Field of Classification Search
CPC   B60R 21/205; B60R 21/215; B60R 21/2165; B60R 2021/21543

USPC ................................................ 280/728.3, 732
See application file for complete search history.

(56) References Cited

U.S. PATENT DOCUMENTS

| | | | |
|---|---|---|---|
| 5,082,310 A |   | 1/1992 | Bauer |
| 5,425,549 A | * | 6/1995 | Oda ........................... 280/728.2 |
| 5,474,324 A | * | 12/1995 | Bentley et al. ............. 280/728.3 |

(Continued)

FOREIGN PATENT DOCUMENTS

| | | |
|---|---|---|
| JP | A-9-48315 | 2/1997 |
| JP | U-3037101 | 5/1997 |
| JP | A-10-100822 | 4/1998 |
| JP | A-10-273004 | 10/1998 |
| JP | A-11-170953 | 6/1999 |
| JP | B2-3009208 | 2/2000 |
| JP | A-2008-44577 | 2/2008 |
| JP | A-2008-62808 | 3/2008 |

*Primary Examiner* — Drew Brown
(74) *Attorney, Agent, or Firm* — Oliff, PLC

(57) ABSTRACT

The decorative panel provided at the instrument panel includes the protruding portion that is engaged with the engagement hole of the airbag door, in a state in which the distal end portion protrudes from the rear surface of the airbag door, and the door decorative portion that is formed integrally with the protruding portion and attached to the front surface of the airbag door by engaging the protruding portion with the engagement hole. The protective plate that includes the protective portion covering the distal end portion of the protruding portion from the airbag side is provided at the rear surface of the airbag door. When the airbag is inflated and deployed, the airbag is prevented from interfering with the distal end portion of the protruding portion.

4 Claims, 6 Drawing Sheets

(56) References Cited

U.S. PATENT DOCUMENTS

| | | | |
|---|---|---|---|
| 5,630,613 | A | 5/1997 | Leonard et al. |
| 5,678,851 | A * | 10/1997 | Saito et al. ................. 280/728.3 |
| 5,941,558 | A | 8/1999 | Labrie et al. |
| 6,322,101 | B1 | 11/2001 | Suizu et al. |
| 6,955,376 | B1 * | 10/2005 | Labrie et al. ............... 280/728.3 |
| 7,000,941 | B2 * | 2/2006 | Yokota et al. .............. 280/728.2 |
| 7,234,725 | B2 * | 6/2007 | Welford ..................... 280/728.3 |
| 8,491,002 | B2 * | 7/2013 | Schneider et al. ......... 280/728.3 |
| 2002/0030352 | A1 | 3/2002 | Iida et al. |
| 2006/0202449 | A1 | 9/2006 | Yokota et al. |
| 2010/0156070 | A1 * | 6/2010 | Takahashi et al. ......... 280/728.3 |

* cited by examiner

AIRBAG DEVICE FOR PASSENGER'S SEAT

BACKGROUND OF THE INVENTION

1. Field of the Invention

The invention relates to an airbag device for a passenger's seat.

2. Description of Related Art

A decorative panel is available that is provided with a protruding portion which is engaged with an engagement hole formed in an instrument panel in a state in which the distal end portion of the protruding portion protrudes from the rear surface of the instrument panel and a main body portion that is formed integrally with the protruding portion and attached to the instrument panel by engaging the protruding portion with the engagement hole (see, for example, Japanese Patent Application Publication No. 2008-44577(JP-A-2008-44577)).

However, when part of such decorative panel is provided at an airbag door and the distal end portion of the protruding portion formed in part of the decorative panel protrudes from the rear surface of the airbag door, the decorative panel can be taken off by the pressure applied by the airbag when the airbag is inflated and deployed to the distal end portion of the protruding portion and the airbag can be caught on the distal end portion of the protruding portion.

SUMMARY OF THE INVENTION

The invention provides an airbag device for a passenger's seat in which the decorative panel can be prevented from being taken off by the pressure applied by the airbag when the airbag is inflated and deployed to the distal end portion of the protruding portion formed at the decorative panel and the airbag can be prevented from being caught on the distal end portion of the protruding portion.

The first aspect of the invention relates to an airbag device for a passenger's seat. The airbag device for a passenger's seat includes: an airbag door provided at an instrument panel; an airbag that is provided in a folded state on a rear side of the airbag door, and that pushes and opens the airbag door upon receiving a supply of gas, and is inflated and deployed on a front surface side of the instrument panel; a protruding portion that is engaged with an engagement hole formed in the airbag door, in a state in which a distal end portion of the protruding portion protrudes from a rear surface of the airbag door; and a decorative panel including a door decorative portion that is formed integrally with the protruding portion and attached to the front surface of the airbag door by engaging the protruding portion with the engagement hole; and a protective plate that includes a protective portion covering the distal end portion of the protruding portion from the airbag side and is provided at the rear surface of the airbag door.

With such a configuration, the protective plate provided at the rear surface of the airbag door includes the protective portion that covers the distal end portion of the protruding portion from the airbag side. Therefore, when the airbag is inflated and deployed, the airbag can be prevented by the protective portion from interfering with the distal end portion of the protruding portion. As a result, the decorative panel can be prevented from being taken off by the pressure applied by the airbag to the distal end portion of the protruding portion when the airbag is inflated and deployed, and the airbag can be prevented from being caught on the distal end portion of the protruding portion.

In the above-described configuration, the airbag door may be connected to the instrument panel by a pair of planned vertical rupture portions arranged side by side in the width direction of a vehicle and extending in the up-down direction of the vehicle; and the decorative panel may include panel decorative portions that are disposed opposite the door decorative portion, with one of the pair of planned vertical rupture portions being interposed between each of the panel decorative portions and the door decorative portion, and attached to the front surface of the instrument panel, and connected to the door decorative portion by thin portions, each of the thin portions extending in the vertical direction of the vehicle along one planned vertical rupture portion.

With such a configuration, the decorative panel includes panel decorative portions disposed opposite the door decorative portion, with the planned vertical rupture portions being interposed therebetween, and these panel decorative portions are connected to the door decorative portion by thin portions, and the thin portions extend in the up-down direction of the vehicle along the planned vertical rupture portions. Therefore, when the airbag door is pushed by the airbag, the thin portions can be also smoothly torn following the tear of the planned vertical rupture portions. As a result, although the decorative panel is configured to include the door decorative portion formed integrally with the panel decorative portions, in other words, although part of the decorative panel formed continuously in the width direction of the vehicle in front of the passenger's seat overlaps the airbag door in the width direction of the vehicle, the opening of the airbag door and subsequent inflation and deployment of the airbag can be prevented from being delayed.

In the above-described configuration, the airbag door may be connected to the instrument panel by a pair of planned vertical rupture portions arranged side by side in the width direction of the vehicle and extending in the up-down direction of the vehicle, and the protective plate may be provided at the rear surface of the airbag door over the entire length in the width direction of the vehicle.

With such a configuration, the protective plate is provided at the rear surface of the airbag door over the entire length in the width direction of the vehicle. Therefore, when the protective plate is pushed by the airbag, following the inflation and deployment of the airbag, the pushing force can be transmitted to the entire rear surface of the airbag door in the width direction of the vehicle. As a result, stresses can be concentrated in the pair of planned vertical rupture portions and therefore the pair of planned vertical rupture portions can be torn even more smoothly.

In the above-described configuration, the airbag door may be rotatably connected to the instrument panel by a hinge extending in the width direction of the vehicle, and the decorative panel may include a decorative support portion that is disposed opposite the door decorative portion, with the hinge being interposed therebetween, and attached to the front surface of the instrument panel, and connected to the door decorative portion by a rotational support portion extending in the width direction of the vehicle along the hinge.

In the above-described configuration, the decorative panel includes a decorative support portion that is disposed opposite the door decorative portion, with the hinge being interposed therebetween, and the decorative support portion is connected to the door decorative portion by the rotation support portion extending in the width direction of the vehicle along the hinge. Therefore, when the airbag door rotates about the hinge with respect to the instrument panel under the pressure applied by the airbag, the door decorative portion provided integrally with the airbag door can be rotated about the rotation support portion with respect to the decorative support portion. As a result, although the decorative panel is configured to include the decorative support portion formed integrally with the door decorative portion, in other words, although the decorative panel is provided along the airbag door and the adjacent portion of the instrument panel adjacent to the airbag door in the up-down direction of the vehicle, the opening of the airbag door and subsequent inflation and deployment of the airbag can be prevented from being delayed.

As described hereinabove in detail, in accordance with the invention, the decorative panel can be prevented from being taken off by the pressure applied by the airbag when the airbag is inflated and deployed to the distal end portion of the protruding portion formed at the decorative panel and the airbag can be prevented from being caught on the distal end portion of the protruding portion.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

An embodiment of the invention will be explained below with reference to the appended drawings. The arrows UP, FR, and RH shown in the figures indicate the upper side in the up-down direction of the vehicle, the forward side in the front-rear direction of the vehicle, and the right side in the width direction of the vehicle.

Figure 1:
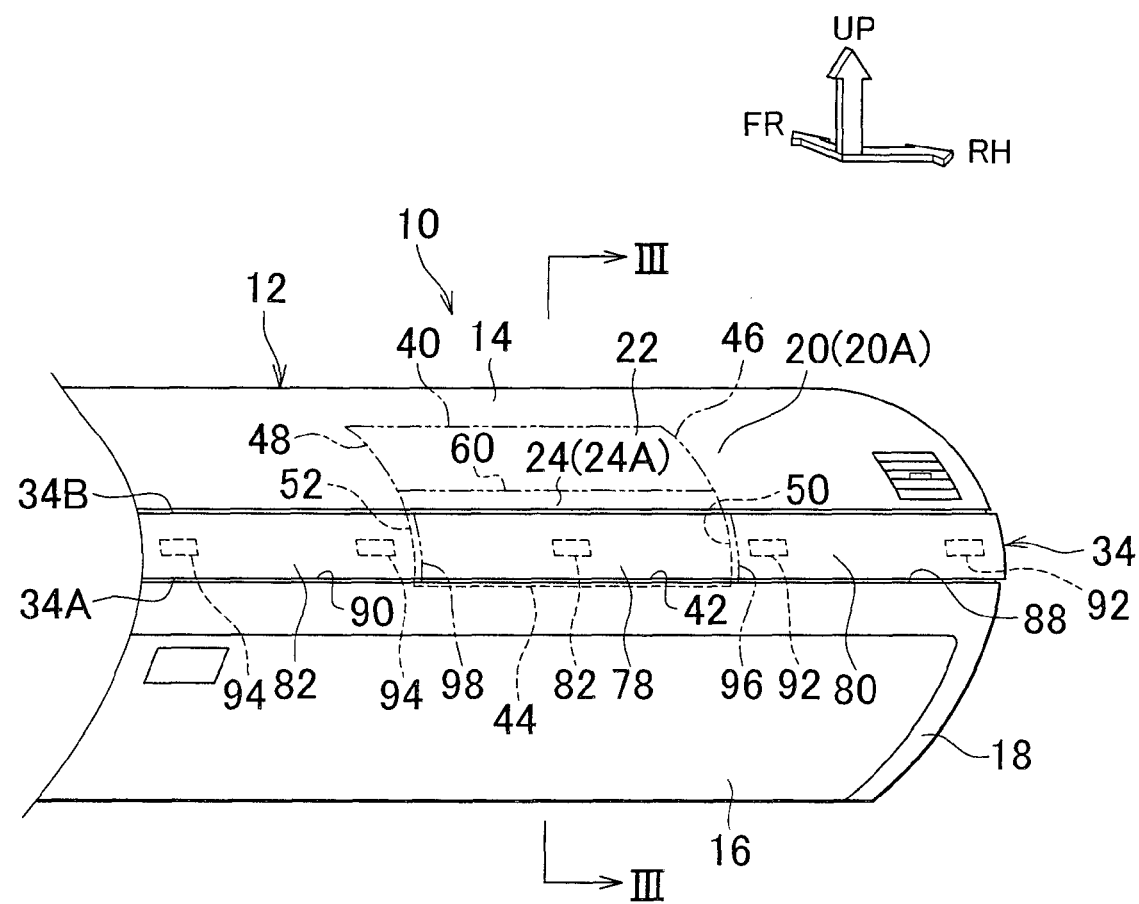
FIG. 1 is a perspective view of a portion, on the passenger's seat side, of the instrument panel provided with the airbag device for a passenger's seat according to one embodiment of the invention.
Figure 2:
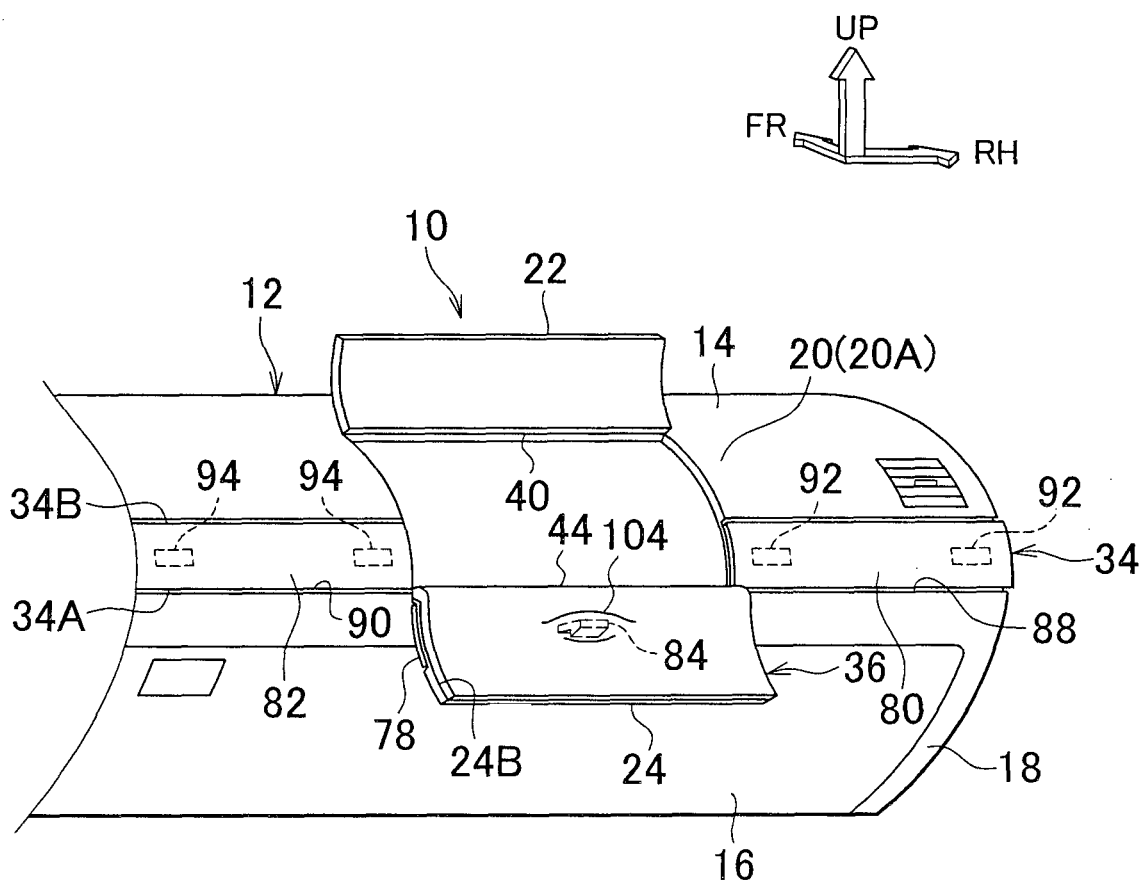
FIG. 2 is a perspective view illustrating the state in which the airbag door in the airbag device for a passenger's seat shown in FIG. 1 is open.

As shown in FIGS. 1 and 2, an instrument panel 12 includes an up-down intermediate portion 20 formed to be curved so as to protrude toward the rear side of the vehicle and the upper side of the vehicle between an upper portion 14 facing toward the upper side of the vehicle and a lower portion 18 provided with a door 16 of a glove box. An airbag device 10 for a passenger's seat according to one embodiment of the invention is provided in the up-down intermediate portion 20 in front of the passenger's seat (not shown in the figure). In other words, the airbag device 10 for a passenger's seat is an airbag device for a passenger's seat of the so-called mid-mount system.

Figure 3:
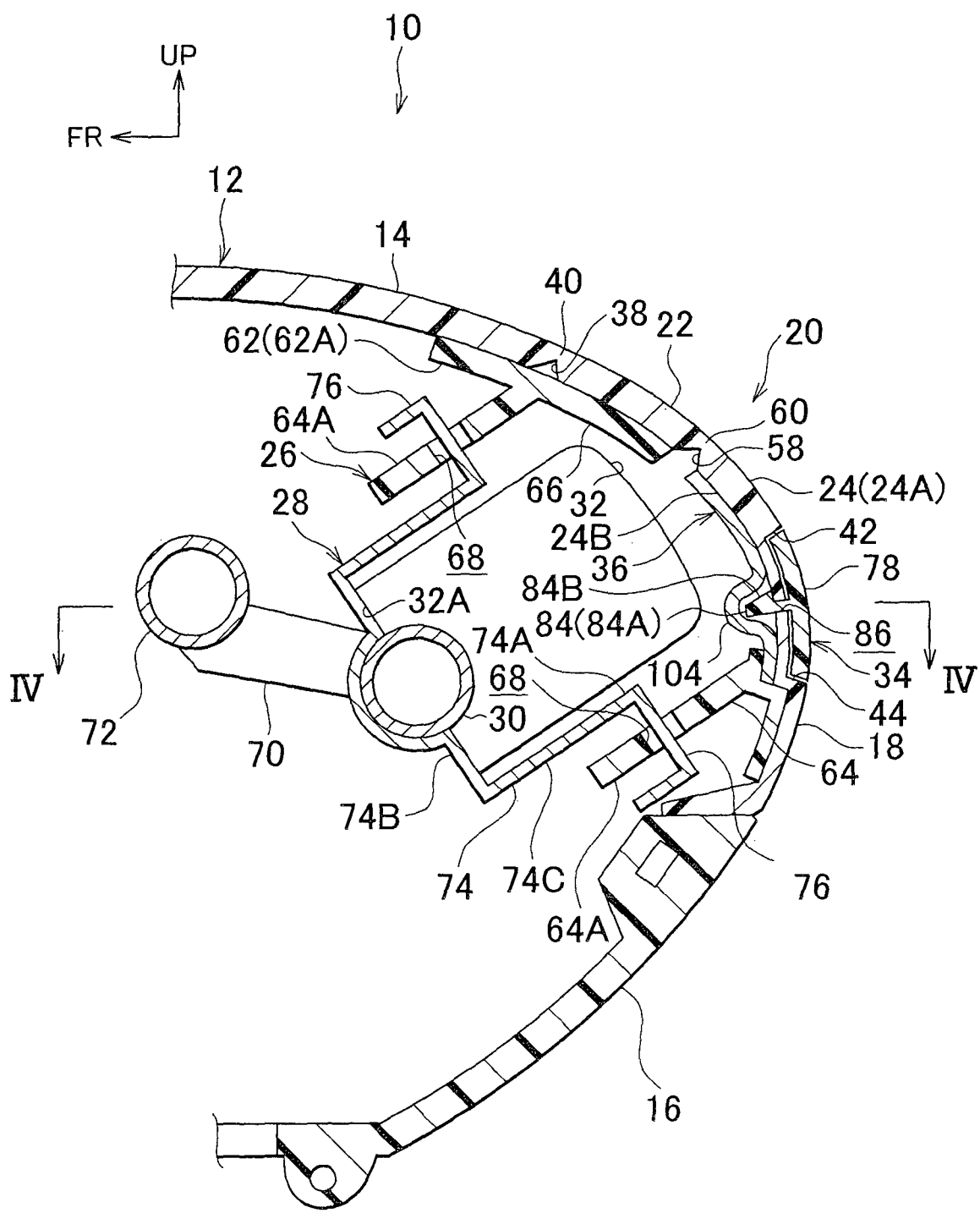
FIG. 3 is a magnified sectional view along the line 3-3 in FIG. 1.

As shown in FIG. 3, the airbag device 10 for a passenger's seat is provided with a pair of airbag doors 22, 24, a retainer 26, a case 28, an inflator 30, an airbag 32, a decorative panel 34, and a protective plate 36.

The pair of airbag doors 22, 24 are disposed side by side in the up-down direction of the vehicle in the up-down intermediate portion 20. A groove 38 with a V-shaped cross section that is open at the rear side of the instrument panel 12 and extends in the width direction of the vehicle is formed between the upper portion 14 and the airbag door 22 facing the upper side of the vehicle. The airbag door 22 is rotatably connected to the upper portion 14, with a thin portion 40 being interposed therebetween. The thin portion is thinner than the upper portion 14 and the airbag door 22 because the groove 38 is formed.

A concave portion 42 extending in the width direction of the vehicle and open toward the rear side of the vehicle is formed at the lower end side of a front surface 24A of the airbag door 24 at the lower side in the up-down direction of the vehicle. The end portion of the airbag door 24 at the lower side in the up-down direction of the vehicle is rotatably connected to a lower portion 18 by a hinge 44 formed adjacent to the lower side of the concave portion 42 in the up-down direction of the vehicle. As shown in FIG. 1, the hinge 44 extends in the width direction of the vehicle and connects the lower ends of a pair of planned vertical rupture portions 50, 52 described hereinbelow.

The end portions of the airbag door 22 at both sides in the width direction of the vehicle are connected to the upper portion of the up-down intermediate portion 20 by means of a pair of planned vertical rupture portions 46, 48 arranged side by side in the width direction of the vehicle and extending in the up-down direction of the vehicle. Likewise, the end portions of the airbag door 24 at both sides in the width direction of the vehicle are connected to the lower portion of the up-down intermediate portion 20 by the pair of planned vertical rupture portions 50, 52 arranged side by side in the width direction of the vehicle and extending in the up-down direction of the vehicle.

The planned vertical rupture portions 50, 52 are formed thinner than the airbag door 24 and the up-down intermediate portion 20 by forming grooves 54, 56 (see FIG. 4) with a V-shaped cross-section that are open toward the rear side of the instrument panel 12. The planned vertical rupture portions 46, 48 are formed similarly to the above-described planned vertical rupture portions 50, 52 and are also thinner than the airbag door 22 and the up-down intermediate portion 20

Further, as shown in FIG. 3, a groove 58 with a V-shaped cross section that extends in the width direction of the vehicle and is open toward the rear side of the instrument panel 12 is formed between the end portions at the adjacent sides of the pair of airbag doors 22, 24. The end portions at the adjacent sides of the pair of airbag doors 22, 24 are connected to each other, with a planned transverse rupture portion 60 being interposed therebetween; the planned transverse rupture portion is formed thinner than the pair of airbag doors 22, 24 by forming the groove 58.

The retainer 26 is provided at the rear side of the instrument panel 12 and constituted by a flange portion 62, a frame portion 64, and a reinforcing portion 66. The flange portion 62 is formed in a frame shape along the circumferential section of the pair of airbag doors 22, 24 in the instrument panel 12 and joined, for example by welding, to the rear surface of the instrument panel 12.

The frame portion 64 is formed in a frame shape along the inner side of the flange portion 62 and protrudes from the flange portion 62 toward the rear side of the instrument panel 12. An engagement hole 68 passing through in the thickness direction is formed in each of a pair of side wall portions 64A of the frame portion 64 which face each other in the up-down direction of the vehicle.

The reinforcing portion 66 is formed to have dimensions and shape substantially identical to those of the airbag door 22 facing the upper side of the vehicle and joined, for example by welding, to the rear surface of the airbag door 22. Further, the reinforcing portion 66 is connected to a side portion 62A located on the upper side in the up-down direction of the vehicle in the flange portion 62 formed in a frame-like shape.

The case 28 is provided at the rear side of the pair of airbag doors 22, 24 and fixed to an instrument panel reinforcement 72 by a bracket 70. The case 28 has a main body portion 74 formed in a box-like shape. The main body portion 74 has an opening 74A facing the pair of the airbag doors 22, 24 and has a bottom portion 74B on the side opposite the opening 74A. The main body portion 74 is disposed inside the frame portion 64, and a pair of engagement pieces 76 extending to respective side wall portions 64A are formed at the opening 74A side in a circumferential wall portion 74C formed in the main body portion 74. These engagement pieces 76 are engaged with respective engagement holes 68.

The inflator 30 is of a cylinder type, has elongated tubular shape, and is disposed so that the width direction of the vehicle is the longitudinal direction thereof. The inflator 30 is fixed to the bottom portion 74B. The inflator 30 is configured to supply a gas into an airbag 32 so as to inflate and deploy the airbag 32 when a signal outputted from a control device (not shown in the figure) is inputted. The aforementioned control device (not shown in the figure) is configured to output a signal to the inflator 30 when the occurrence of front collision is actually detected in the vehicle or when the occurrence of front collision in the vehicle is predicted.

The airbag 32 is accommodated in a folded state inside the case 28, and a base end portion 32A thereof is fixed to the bottom portion 74B. Further, the airbag 32 is configured to push and open the pair of airbag doors 22, 24 and inflate and deploy at the front side of the instrument panel 12 when the gas is supplied from the inflator 30.

As shown in FIG. 1, a decorative panel 34 is formed in an elongated shape extending in the width direction of the vehicle and configured to be separate from the instrument panel 12. The decorative panel 34 is formed to have a width in the up-down direction of the vehicle that is less than the width of the airbag door 24 on the lower side in the up-down-direction of the vehicle and disposed so as to allow the lower portion of the airbag door 24 to pass therethrough. More specifically, the decorative panel 34 is disposed at a height such that a lower end portion 34A thereof matches the above-described hinge 44. The decorative panel 34 has a door decorative portion 78 provided at the airbag door 24 and a pair of panel decorative portions 80, 82 formed at both sides of the door decorative portion 78 in the width direction of the vehicle.

Figure 4:
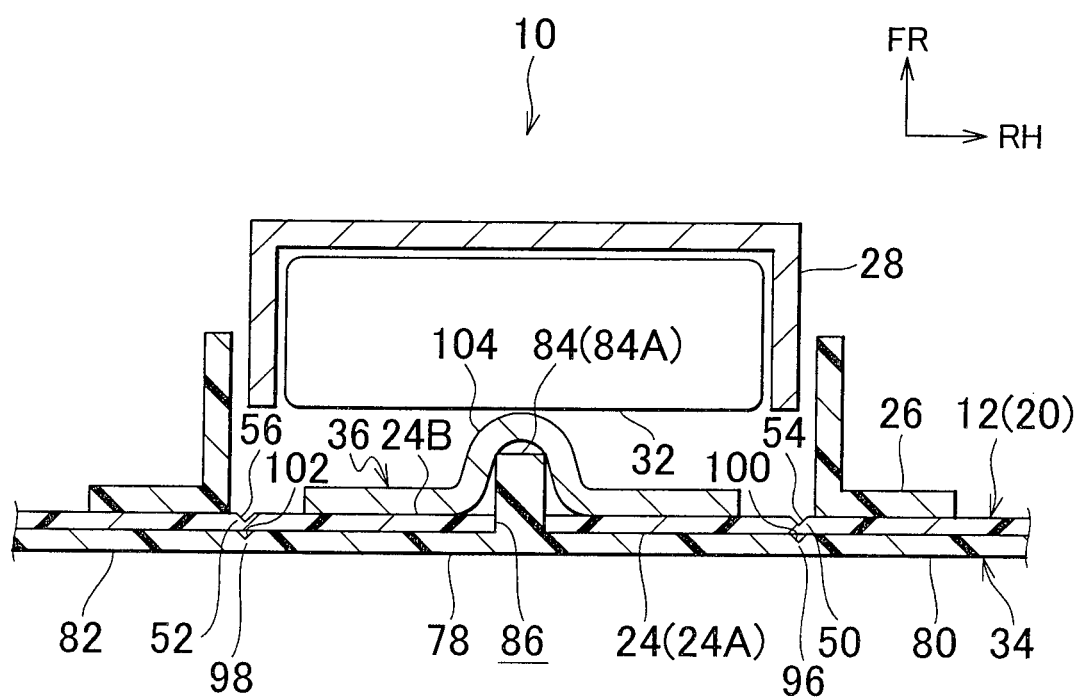
FIG. 4 is a magnified sectional view along the line 4-4 in FIG. 3.

The door decorative portion 78 is accommodated in the concave portion 42, and a protruding portion 84 that protrudes toward the rear side of the airbag door 24 is formed integrally in the central portion of the door decorative portion in the width direction of the vehicle. As shown in FIGS. 3 and 4, the protruding portion 84 is inserted into an engagement hole 86 formed in the airbag door 24 so as to pass therethrough in the sheet thickness direction, and a distal end portion 84A of the protruding portion protrudes from the rear surface 24B of the airbag door 24. Further, as shown in FIG. 3, a hook 84B is formed integrally at the distal end portion 84A of the protruding portion 84, and this hook 84B is locked from the rear side of the airbag door 24 to the circumferential edge portion of the engagement hole 86. The door decorative portion 78 is attached to the front surface 24A of the airbag door 24 by so engaging the protruding portion 84 with the engagement hole 86.

As shown in FIG. 1, the panel decorative portion 80 is disposed on the side (right side of the vehicle) opposite that of the door decorative portion 78 so that the planned vertical rupture portion 50 is sandwiched therebetween, and the panel decorative portion 82 is disposed on the side (left side of the vehicle) opposite that of the door decorative portion 78 so that the planned vertical rupture portion 52 is sandwiched therebetween. The pair of panel decorative portions 80, 82 is respectively accommodated in concave portions 88, 90 formed in the front surface 20A of the up-down intermediate portion 20 in the same manner as the above-described concave portion 42. Further, these panel decorative portions 80, 82 have protruding portions 92, 94 similar to the above-described protruding portion 84 and are attached to the front surface 20A of the up-down intermediate portion 20 by engaging the protruding portions 92, 94 with engagement holes (not shown in the figure) formed in the up-down intermediate portion 20.

As shown in FIGS. 1 and 4, the panel decorative portion 80 is connected to the door decorative portion 78 at the end thereof on the outer side in the width direction of the vehicle by a vertical thin portion 96 extending in the up-down direction of the vehicle along the planned vertical rupture portion 50. Likewise, the panel decorative portion 82 is connected to the door decorative portion 78 at the end thereof on the inner side in the width direction of the vehicle by a vertical thin portion 98 extending in the up-down direction of the vehicle along the planned vertical rupture portion 52. As shown in FIG. 4, grooves 100, 102 with a V-shaped cross section that are open toward the rear side of the instrument panel 12 are formed in the vertical thin portions 96, 98. As a result, the vertical thin portions are formed to be thinner than the door decorative portion 78 and panel decorative portions 80, 82. The vertical thin portions 96, 98 may function as thin portions in accordance with the invention.

As shown in FIGS. 3 and 4, the protective plate 36 is provided at the rear surface 24B of the airbag door 24. The protective plate 36 is made, for example, from a metal sheet, integrated with the retainer 26 by outsert molding or the like (see FIG. 3), and fixed to the rear surface 24B of the airbag door 24, for example, with an adhesive. As shown in FIGS. 2 and 4, the protective plate 36 extends in the width direction of the vehicle and is provided along the substantially entire length of the rear surface 24B of the airbag door 24 in the width direction of the vehicle. A protective portion 104 bulging toward the rear side of the airbag door 24 is formed in the central portion, in the width direction of the vehicle, of the protective plate 36. As shown in FIGS. 3 and 4, the protective portion 104 covers the distal end portion 84A of the protruding portion 84 from the airbag 32 side. In other words, the distal end portion 84A of the protruding portion 84 is accommodated inside the protective portion 104.

In the figures, the protruding portion 84 and the protective portion 104 are shown on an enlarged scale to facilitate the understanding of the configuration.

The operation and effect of one embodiment of the invention will be explained below.

As shown in FIGS. 3 and 4, with the airbag device 10 for a passenger's seat according to the embodiment of the invention, the protective plate 36 provided at the rear surface 24B of the airbag door 24 has the protective portion 104 that covers the distal end portion 84A of the protruding portion 84 from the airbag 32 side. Therefore, when the airbag 32 is inflated and deployed, the airbag 32 can be prevented by the protective portion 104 from interfering with the distal end portion 84A of the protruding portion 84. As a result, the decorative panel 34 can be prevented from being taken off by the pressure applied by the airbag 32 to the distal end portion 84A of the protruding portion 84 when the airbag 32 is inflated and deployed, and the airbag 32 can be prevented from being caught on the distal end portion 84A of the protruding portion 84.

Further, the decorative panel 34 has a pair of panel decorative portions 80, 82 disposed at both sides of the door decorative portion 78 in the width direction of the vehicle, and the pair of panel decorative portions 80, 82 is connected to the door decorative portion 78 by the vertical thin portions 96, 98. However, these vertical thin portions 96, 98 extend in the up-down direction of the vehicle along the planned vertical fracture portions 50, 52, respectively. Therefore, when the airbag door 24 is pushed by the airbag 32, the vertical thin portions 96, 98 can be also smoothly torn following the tear of the planned vertical fracture portions 50, 52. As a result, although the decorative panel 34 is configured to have the door decorative portion 78 formed integrally with the panel decorative portions 80, 82 (in other words, although part of the decorative panel 34 formed continuously in the width direction of the vehicle in front of the passenger's seat overlaps the airbag door 24 in the width direction of the vehicle), the opening of the airbag door 24 and subsequent inflation and deployment of the airbag 32 can be prevented from being delayed.

Furthermore, the protective plate 36 is provided at the rear surface 24B of the airbag door 24 over the entire length in the width direction of the vehicle. Therefore, when the protective plate 36 is pushed by the airbag 32 following the inflation and deployment of the airbag 32, the pushing force can be transmitted to the entire rear surface 24B of the airbag door 24 in the width direction of the vehicle. As a result, stresses can be concentrated in the pair of planned vertical rupture portions 50, 52 and the pair of vertical thin portions 96, 98 and therefore the pair of planned vertical rupture portions 50, 52 and the pair of vertical thin portions 96, 98 can be torn even more smoothly.

Further, although the door decorative portion 78 is provided at the airbag door 24, the opening of the airbag door 24 can be ensured as described hereinabove. Therefore, it is possible to avoid placing restrictions on the arrangement of the decorative panel 34 and the degree of freedom in arranging the decorative panel 34 can be increased.

A variation example of one embodiment of the invention will be explained below.

In the abovementioned embodiment, the decorative panel 34 is disposed at a height such that the lower end portion 34A thereof matches the hinge 44, but the below-described configuration may be also used.

Figure 5:
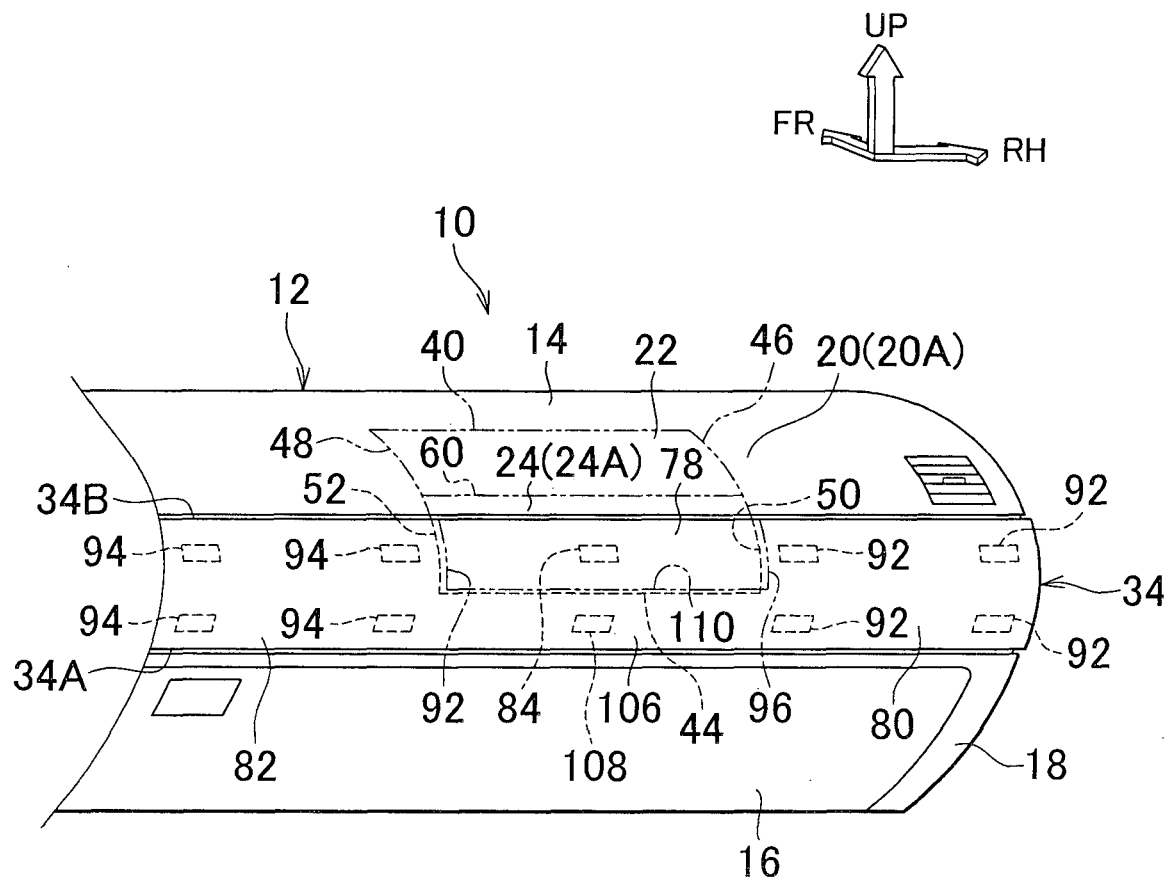
FIG. 5 is a perspective view illustrating a variation example of the decorative panel shown in FIG. 1.
Figure 6:
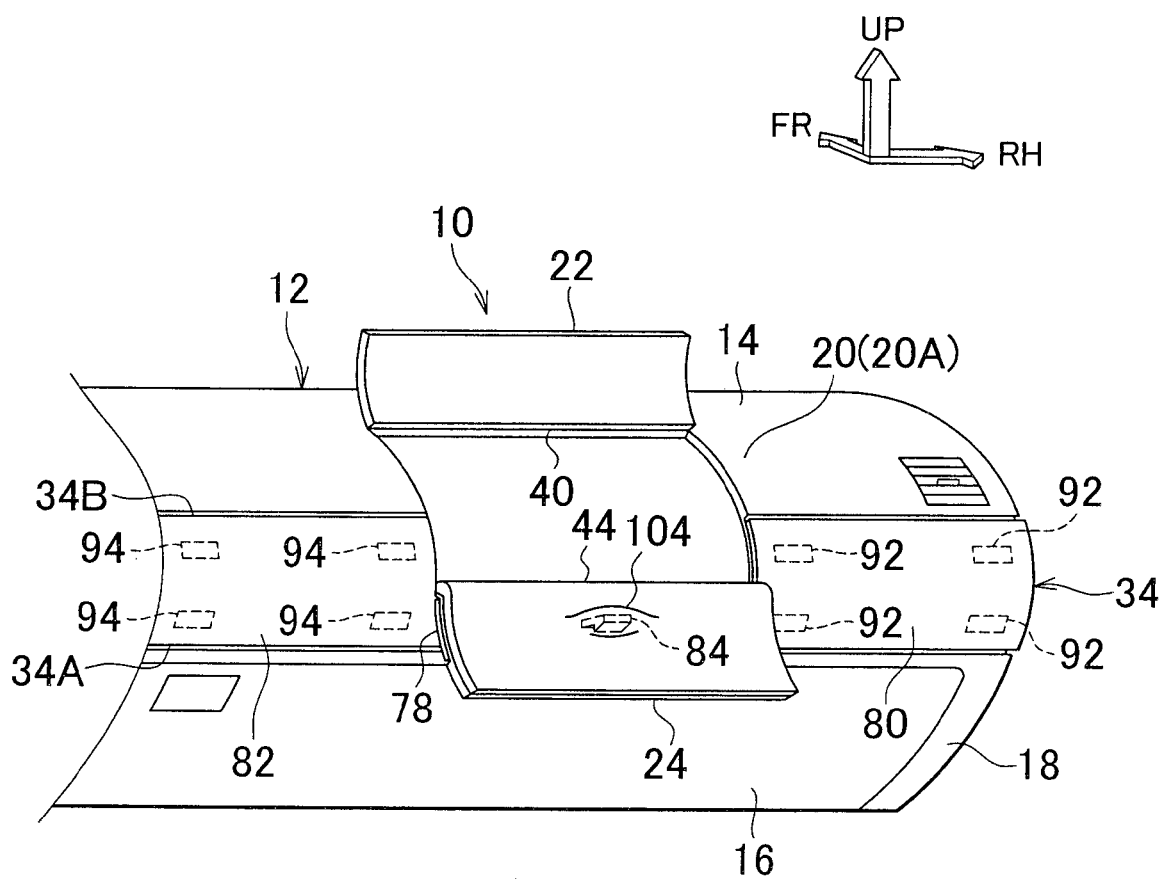
FIG. 6 is a perspective view illustrating the state in which the airbag door in the airbag device for a passenger's seat shown in FIG. 5 is open.

Thus, in the variation example shown in FIGS. 5 and 6, the decorative panel 34 is formed to be wider in the up-down direction of the vehicle than in the abovementioned embodiment, and the lower end portion 34A thereof is positioned lower than the hinge 44 in the up-down direction of the vehicle. A portion of the decorative panel 34 located below the hinge 44 in the up-down direction of the vehicle is formed as a decorative support portion 106 between the pair of panel decorative portions 80, 82 in the width direction of the vehicle.

The decorative support portion 106 has a protruding portion 108 similar to the above-described protruding portion 84. The decorative support portion 106 is attached to the front surface 20A of the up-down intermediate portion 20 by engaging the protruding portion 108 with an engagement hole (not shown in the figure) formed in the up-down intermediate portion 20. Further, the decorative support portion 106 is connected to the door decorative portion 78 by a transverse thin portion 110 extending in the width direction of the vehicle along the hinge 44. The transverse thin portion 110 is configured similarly to the vertical thin portions 96, 98 and formed to be thinner than the door decorative portion 78 and the decorative support portion 106.

In this variation example, the decorative panel 34 has the decorative support portion 106 disposed opposite (below in the up-down direction of the vehicle) the door decorative portion 78, with the hinge 44 being interposed therebetween. However, the decorative support portion 106 is connected to the door decorative portion 78 by the transverse thin portion 110 extending in the width direction of the vehicle along the hinge 44. Therefore, when the airbag door 24 rotates about the hinge 44 with respect to the instrument panel 12 under the pressure applied by the airbag 32, the door decorative portion 78 provided integrally with the airbag door 24 can be rotated about the transverse thin portion 110 with respect to the decorative support portion 106.

As a result, although the decorative panel 34 is configured to have the decorative support portion 106 formed integrally with the door decorative portion 78, in other words, although the decorative panel 34 is provided along the airbag door 24 and the lower portion of the up-down intermediate portion 20 adjacent to the airbag door in the up-down direction of the vehicle, the opening of the airbag door 24 and subsequent inflation and deployment of the airbag 32 can be prevented from being delayed.

The transverse thin portion 110 may also function as a rotation support portion in the invention. Further, in the variation example, for example, the door decorative portion 78 and the decorative support portion 106 may be connected by a hinge with a U-like cross section that forms a convexity on the rear side of the instrument panel 12, instead of the transverse thin portion 110. In this case, the hinge with a U-like cross section may function as a rotation support portion in the invention.

Further, the door decorative portion 78 is connected to the pair of panel decorative portions 80, 82 by the vertical thin portions 96, 98, respectively, but the door decorative portion may be also configured as a body separate from the pair of panel decorative portions 80, 82 and be separated therefrom.

The protective plate 36 is made from a sheet metal, but when the decorative panel 34 can be prevented from being taken off by the pressure applied by the airbag 32 to the distal end portion 84A of the protruding portion 84 when the airbag 32 is inflated and deployed, and the airbag 32 can be prevented from being caught on the distal end portion 84A of the protruding portion 84, the protective plate may be formed form other material, for example, a resin.

In order to fix the door decorative portion 78 to the front surface 24A of the airbag door 24, the hook 84B is formed at the distal end portion 84A of the protruding portion 84. However, an elastic piece that is engaged, following elastic deformation, with the circumferential edge portion of the engagement hole 86 from the rear side of the airbag door 24 may be formed instead of the hook 84B. In other words, the protruding portion 84 may be formed as a clip having the elastic piece.

Further, the decorative panel 34 is configured to have a pair of panel decorative portions 80, 82, but a configuration in which either of the pair, of panel decorative portions 80, 82 is omitted may be also used.

The decorative panel 34 is disposed at a height such as to overlap the airbag door 24 on the lower side in the up-down direction of the vehicle, but the decorative panel may be also disposed at a height such as to overlap the airbag door 22 on the upper side in the up-down direction of the vehicle. In this case, the upper end portion 34B of the decorative panel 34 may be positioned above the thin portion 40 in the up-down direction of the vehicle.

In this case, a portion of the decorative panel 34 above the thin portion 40 in the up-down direction of the vehicle may be formed as a decorative support portion between the pair of panel decorative portions 80, 82 in the width direction of the vehicle, and this decorative support portion may extend in the width direction of the vehicle along the thin portion 40 and be connected to the door decorative portion 78 by a rotation support portion such as the thin portion. In other words, the pair of airbag doors 22, 24 and the decorative panel 34 may be at positions reversed in the up-down direction in FIGS. 5 and 6.

The airbag device 10 for a passenger's seat is explained as an airbag device for a passenger's seat of a mid-mount type that is provided in the up-down intermediate portion 20 of the instrument panel 12, but the device may also be, for example, an airbag device for a passenger's seat of a top-mount type that is provided in the upper portion 14 of the instrument panel 12.

One embodiment of the invention is explained above, but the invention is not limited to the above-described invention, and it goes without saying that the invention can be implemented in various modifications, without departing from the scope thereof.

The airbag door is provided in the up-down intermediate portion formed to be curved so as to protrude toward the rear side of the vehicle and the upper side of the vehicle between the upper and lower portions of the instrument panel.

The airbag device for a passenger's seat in this case is a airbag device for a passenger's seat of the so-called mid-mount system. With such an airbag device for a passenger's seat, the airbag is deployed at a position closer to the occupant of the passenger's seat than in the case of an airbag device for a passenger's seat of the so-called top-mount system that is provided in the top portion of the instrument panel. As a result, the capability to restrain the occupant of the passenger's seat can be increased.

The invention claimed is:

1. A passenger seat airbag device, comprising:
   an airbag door provided at an instrument panel;
   an airbag that is provided in a folded state at a rear side of the airbag door, pushes and opens the airbag door upon receiving a supply of gas, and is inflated and deployed at a front surface side of the instrument panel;
   a protruding portion that is engaged with an engagement hole formed in the airbag door, in a state in which a distal end portion of the protruding portion protrudes from a rear surface of the airbag door; and
   a decorative panel including a door decorative portion that is formed integrally with the protruding portion and is attached to the front surface of the airbag door by engaging the protruding portion with the engagement hole; and
   a protective plate that includes a protective portion covering the distal end portion of the protruding portion from the airbag side and is provided at the rear surface of the airbag door, wherein
   the airbag door is connected to the instrument panel by a pair of planned vertical rupture portions arranged side by side in the width direction of a vehicle and extending in the up-down direction of the vehicle; and
   the decorative panel includes panel decorative portions that are disposed opposite the door decorative portion, with one of the pair of planned vertical rupture portions being interposed between each of the panel decorative portions and the door decorative portion, and attached to the front surface of the instrument panel, and connected to the door decorative portion by thin portions, each of the thin portions extending in the vertical direction of the vehicle along one planned vertical rupture portion.

2. The passenger seat airbag device according to claim 1, wherein the airbag door is connected to the instrument panel by a pair of planned vertical rupture portions arranged side by side in the width direction of the vehicle and extending in the up-down direction of the vehicle, and the protective plate is provided at the rear surface of the airbag door over the entire length in the width direction of the vehicle.

3. The passenger seat airbag device according to claim 1, wherein the airbag door is rotatably connected to the instrument panel by a hinge extending in the width direction of the vehicle, and the decorative panel includes a decorative support portion that is disposed opposite the door decorative portion, with the hinge being interposed there between, and attached to the front surface of the instrument panel, and connected to the door decorative portion by a rotational support portion extending in the width direction of the vehicle along the hinge.

4. The passenger seat airbag device according to claim 1, wherein the airbag door is provided at an up-down intermediate portion formed to be curved so as to protrude toward the rear side of the vehicle and the upper side of the vehicle between an upper portion and a lower portion of the instrument panel.

* * * * *